May 2, 1961

H. F. SWENSON 2,982,009

ADJUSTABLE CUTTER RAKE TOOL

Original Filed June 12, 1956

INVENTOR
HENRY F. SWENSON
BY
ATTORNEY

2,982,009
ADJUSTABLE CUTTER RAKE TOOL

Henry F. Swenson, Roseland, N.J.
(87 Dorsa Ave., Livingston, N.J.)

Original application June 12, 1956, Ser. No. 590,970, now Patent No. 2,962,800, dated Dec. 6, 1960. Divided and this application Mar. 10, 1960, Ser. No. 14,024

4 Claims. (Cl. 29—105)

This invention relates to an adjustable rake cutter tool.

This application is filed as a division of my copending application, Serial No. 590,970, filed June 12, 1956, issued December 6, 1960 as Patent No.2,962,800, the subject matter of this application being fully disclosed in said parent application, but being rejected on requirement for division.

It is an object of this invention to provide a hard bit cutting tool which will at all times present to tool to the work at the desired angle, and yet which will yield under extreme pressure, without breaking the cutting edge or digging into the work, and nevertheless will return to position when the pressure is released.

It is a further object to provide a tool of the character described which can employ hard bit cutters, such as carbide, in such a manner that a plurality of cutting edges of the tool may be used successively, but which will permit the cutting edge to yield without breaking the edge on encountering excessive pressures.

In the type of cutting tool having separable cutting bits, it is common to make the cutter of square or polygonal shape, with its edge faces perpendicular to the flat faces, and to mount the flat face at a trailing angle to the work, so that the edge face at the cutting side has a proper rake angle with the work. In this manner, each of the edges of the bit may be employed as the cutting edge in turn, and each will have the same rake angle.

It is a further object to provide a holder of the character described, in which the rake angle may be adjusted at will to fit the nature of the work.

It is a further object to provide a construction for either a single bit cutter or a rotary miller in which a bit may be removed, or indexed, or replaced, without the need of any extensive readjustment.

The invention accordingly comprises the device, embodiments of which are hereinafter described, and are shown in the accompanying drawings, in which Fig. 1 is a rotary milling cutter having a plurality of bits embodying this invention;

Figure 1:
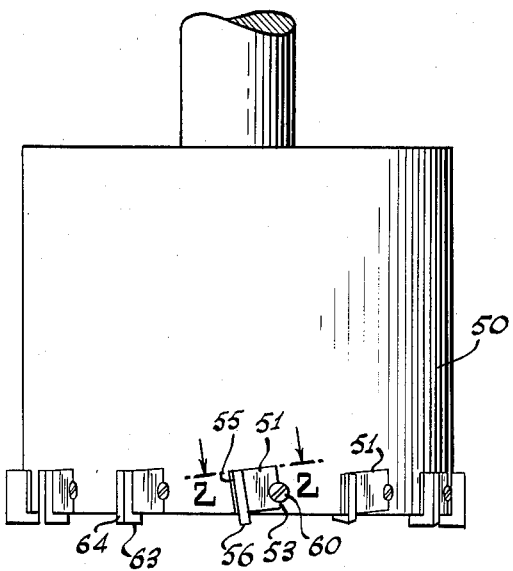
Figure 2:
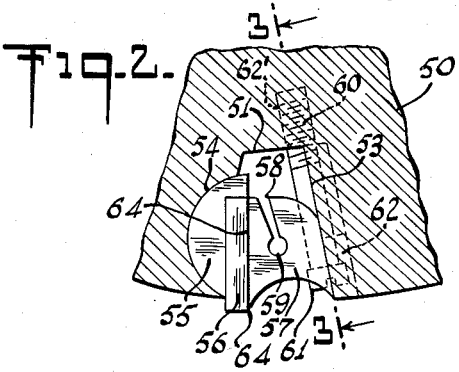
Fig. 2 is an enlarged section on the line 2—2 of Fig. 1.
Figure 3:
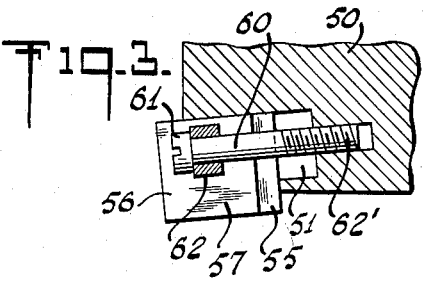
Fig. 3 is an enlarged section on the line 3—3 of Fig. 2.

In this embodiment of the invention the cutter comprises a cylindrical body 50 having a plurality of cavities 51 in its lower outer edge, the shape and nature of which is more clearly shown in Figs. 2 and 3, and these cavities are generally wedge-shaped, being substantially flat upon one side 53 but having a cylindrical recess 54 cut into the other side to receive a block 55, having a cylindrical outer surface and a diametric face. This block is cut out on its diametric face to receive a cutter bit 56 held in the cut out in the block. This block 55 and the cutter 56 within the recess 54 are held in place by a wedge-shaped clamping block 57 having one side adapted to bear upon the bit 56 and the other side to bear upon the surface 53 on the other side of the cavity.

As in the embodiment of my parent application, this clamping block 55 has a longitudinal slot 58 cut in its back face preferably terminating in a circular bore 59 and the block itself is composed of spring material so that when it is wedged in place against the bit, the spring action permits a slight yielding of the bit as it encounters the edge of the work or on reaching a hard place in the material to be cut.

The clamping block 57 is held by a screw 60 having a head 61. This screw passes through an ear 62 upon the clamping block 57 and screws into the body 50, as shown at 62.

The angle which the cutting edge 64 at the end of the block presents to the work, will, as will be readily seen, be determined by the angle which the axis of the cylindrical segment 54 bears to the cutting plane. The angle of the cutting edge 65, however, is determined by the angle of the face 53 of the recess, which is fixed, and by the angularity of the faces of the clamping block 57. On this account, the cutting angle of the face 64 can be changed by substituting new blocks 57 having a different angle, in place of those previously used.

Figure 4:
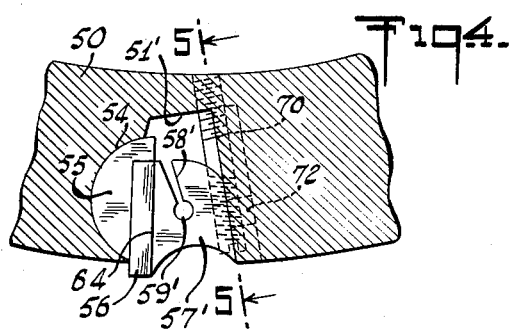
Fig. 4 is a modification of the structure of Fig. 2.
Figure 5:
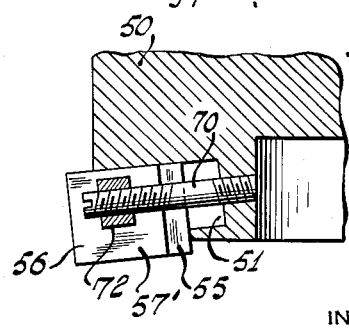
Fig. 5 is a section on the line 5—5 of Fig. 4.

The construction of Figs. 4 and 5 differs from that of Figs. 2 and 3 only in that the screw 60 of Fig. 4, one end of which, for the right hand screw, screws into the body and the outer end for the left hand thread screws into the ear 72 on the block 57. In the figures, the elements designated by a prime mark ('), i.e. 57', 58' and 59' are substantially identical with the parts 57, 58 and 59 of the other views.

With any of these constructions, it will be clear that the bit may be indexed to utilize all of its six or eight cutting faces, and it may be replaced at will simply by taking out the one bit and putting in a new one, without the need of any new adjustment. Thus particularly in the rotary type of cutter, the cutter may be used at maximum efficiency for the minimum of labor for the replacement of cutters.

What is claimed is:

1. A cutting head comprising a cylindrical body having a concentric drive axis and a working face, said face having a plurality of cavities spaced around its periphery, each of said cavities having a semi-cylindrical surface on one side thereof, the axis of each of said surfaces being substantially parallel to the axis of the body, each of said cavities having a pressure face opposite to said semi-cylindrical face, a semi-cylindrical cutting tool fitting into each of said semi-cylindrical surfaces, said cutting tool including a bit having one face in a radial plane of said body, terminating in a cutting edge extending beyond the periphery of said body, and spring means within said cavity and bearing against said face for resiliently holding said cutting tool in its cavity and to hold its face substantially in a radial plane of said head.

2. A cutting head comprising a cylindrical body having a concentric drive axis and a working face, said face having a plurality of cavities spaced around its periphery, each of said cavities having a semi-cylindrical surface on one side thereof, the axis of each of said surfaces being substantially parallel to the axis of the body, each of said cavities having a pressure face opposite to said semi-cylindrical face, a semi-cylindrical cutting tool fitting into each of said semi-cylindrical surfaces, said cutting tool including a bit having a cutting edge extending beyond the periphery of said body and spring means within said cavity and bearing against said presser face for resiliently holding said cutting tool substantially in a radial plane with said head, and means for adjusting said spring means to alter the plane surface of said cutting tools.

3. A tool holder for supporting a cutting tool upon a rotating machine comprising a cylindrical block having its axis parallel to the axis of the machine and having a plurality of pockets disposed about its periphery, each pocket having on one side thereof a semicylindrical recess and an opposite face, each recess having its axis substantially parallel to the axis of the block, a semicylindrical cutter member supported within each recess, each member having a cut-out on its diametrical face, a cutter bit in each cut-out with a cutting edge extending out beyond the surface of the rotary block, and a spring block between said opposite face and said cutterbit for yieldingly holding said cutter bit in predetermined position for cutting.

4. A device according to claim 3 having means for adjusting the position of the spring block to adjust the angular position of the cutter face on the cutter block.

References Cited in the file of this patent
UNITED STATES PATENTS 2,962,800   Swenson _____ Dec. 6, 1960